Figure 2:
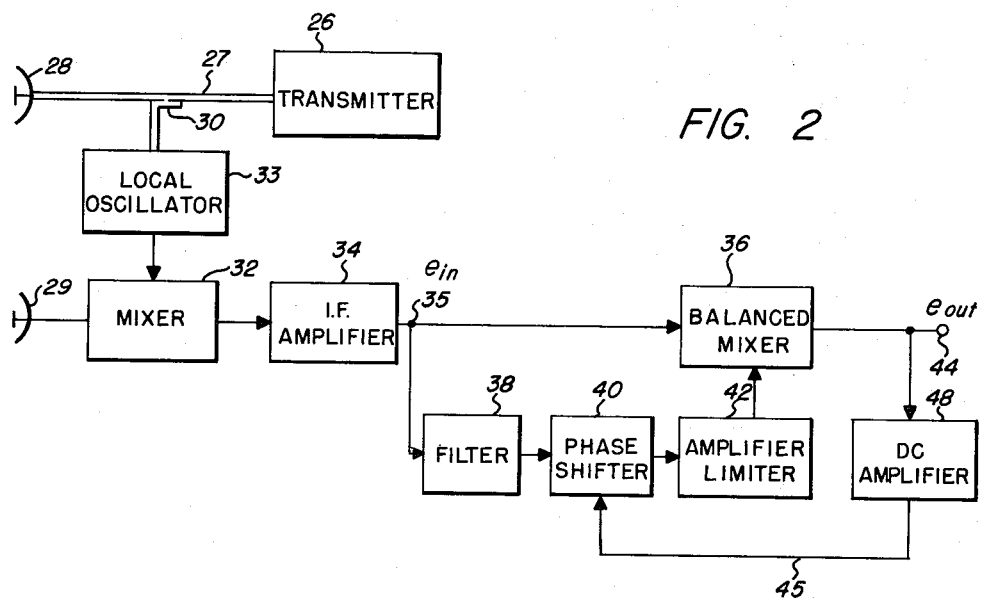

May 5, 1964     T. R. BOUGHNOU     3,132,339

SIDEBAND CANCELLATION SYSTEM

Filed Jan. 3, 1961

INVENTOR
THOMAS R. BOUGHNOU

BY Herbert W. Arnold

ATTORNEY

United States Patent Office 3,132,339
Patented May 5, 1964

3,132,339
SIDEBAND CANCELLATION SYSTEM
Thomas R. Boughnou, Orlando, Fla., assignor to Raytheon Company, Lexington, Mass., a corporation of Delaware
Filed Jan. 3, 1961, Ser. No. 80,331
12 Claims. (Cl. 343—8)

This invention relates to a cancellation system for removing particular signals from an output signal, such as undesired sideband signals, particularly for use with coherent Doppler systems, and more specifically to a system in which the input signal, which is the source of sideband noise signals, is directly operated upon and used to cancel the undesired sideband noise signals. The invention is especially applicable to those systems in which the undesired signal sidebands are not related in phase to the presence of the carrier signal.

In signal transmitting systems utilizing a transmitter and receiver, the output signal from the transmitter is a continuous wave of energy which is changed in frequency by reflections from a moving target. This change in frequency is called the Doppler effect and is detected by continuously comparing the incoming reflected signal with the outgoing transmitted signal and then feeding the frequency change or Doppler signal to a receiver. However, a serious problem encountered in such a coherent Doppler system is the generation of undesired symmetrical AM and FM sidebands incurred within the transmitter and radio frequency circuit components and the introduction of noise by way of these sidebands into the receiver. Such sideband signals may be due to tube noise and/or microphonic noise signals which enter the receiver and result in degradation of system sensitivity. Attempts have been made to eliminate sidebands by development of nulling systems in which ferrite modulators are arranged in a bridge so that a single sideband signal is developed of such phase and amplitude as to cancel any carrier leakage from transmitter to receiver. The bridge is fed from the transmitter and a receiving antenna. Phase detectors in the receiver provide A.C. and D.C. voltages which are used to adjust the phase amplitude of the single sideband signal to cancel the carrier leakage. However, the carrier phase of the nulled signal still contains undesirable signals which are above the desired signal level. In addition, such systems further require separate phase and amplitude controls for balancing separate feedthrough channels in addition to a separate local oscillator used as a reference signal.

It is an object of the invention, therefore, to further improve the signal-to-noise ratio of the system by exclusion of AM or FM undesired sideband noise.

In the present invention, a correction or reference signal is produced directly from an input signal, which, in one embodiment, contains a carrier, undesired noise sidebands, and a single sideband signal of the Doppler type. The correction or reference signal is obtained by sampling the input signal and passing the sample portion of the input signal through a narrow band filter to remove all sideband signals and to pass only the carrier frequency $f_0$. This reference frequency signal is adjusted in phase by a phase-shifting element. The output the phase-shifting element is fed to an amplifier and limiter prior to being mixed in proper phase with the input signal to cancel one sideband signal with the other sideband signal. This provides an output video spectrum containing only the desired Doppler signal and the D.C. component voltage proportional to any minute phase misadjustment of the phase shifter. Thus, by translating down to video from the original carrier input signal and by adjusting the phase of the reference signal, the upper and lower sideband signals cancel each other and attendant noise or undesired signals are cancelled. It is then possible to retain the single sideband information, such as the desired Doppler signal. In order for the upper and lower sidebands to cancel each other, it is necessary that only one phase relation is maintained in the phase-shifting element. For suppression of amplitude-modulated sidebands and odd-order FM sidebands, the phase relation of the phase-shifting element is adjusted to achieve a phase shift of 90°, while for suitable cancellation of even-order frequency-modulated sideband signals, the phase-shifting element is adjusted to phase shift the reference signal zero degrees. In this manner, generation of symmetrical AM or FM undesired signals, such as microphonic noise signals, in the associated circuit components is eliminated without the generation of a separate reference signal and the use of independent phase and amplitude balance control of such reference signals, as is generally necessary in feedthrough nulling circuits.

In a broad aspect, the invention discloses the folding in a mixer of any symmetrical radio or audio-frequency spectrum preferably by translating down to a video or lower frequency from the original carrier prior to cancelling one sideband with the other sideband to retain the desired signal at the intermediate frequency.

The invention further discloses the addition of a closed loop function which corrects for phase variation between the signal and reference channels by sampling the direct current output signal. The loop thus constitutes a dynamic adjustment of the phase-shifting element.

Figure 1:
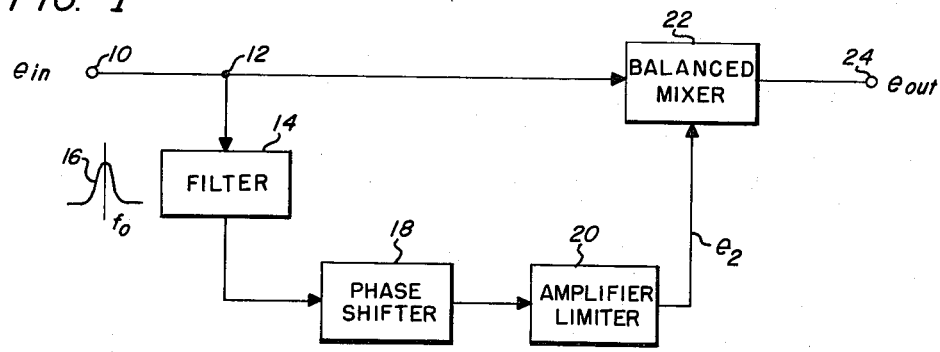

Other and further objects and advantages of this invention will become apparent as the description thereof progresses, reference being had to the accompanying drawing, wherein:

FIG. 1 is a block diagram of a sideband cancellation system according to the invention; and FIG. 2 is a block diagram of a continuous wave radar system embodying one form of the inventive apparatus showing a closed loop dynamic phase adjustment.

Referring now to FIG. 1, an input signal, $e_{in}$, at terminal 10 contains a carrier with AM or FM sidebands and a single sideband signal of the Doppler type, such as provided by the radar system to be described with reference to FIG. 2. The input signal is sampled by a well-known voltage divider, not shown, or fed directly from point 12 to a narrow band filter 14 which is adapted to filter all signal components except the reference frequency. The narrow band filter 14 is a conventional filter, such as a crystal filter, adjusted to pass the carrier frequency of the input signal. The output of filter 14, as seen in the waveform 16, is fed to a phase shifter 18 of a well-known type, such as a variable LC network. For suppression of AM sidebands, the phase shifter is adjusted to provide a 90-degree phase shift, whereas to remove FM sidebands from the input signal, the phase shift through the phase shifter is set to zero degrees. The suppression of even-ordered FM sidebands requires the setting of the phase shifter to provide a 90-degree phase shift, which is the same setting for the removal of symmetrical amplitude-modulated sidebands. However, the phase shifter is set to zero phase shift as the necessary condition to suppress odd-ordered FM sidebands.

The output of phase shifter 18 is fed to an amplifier and limiter 20 to provide a reference output signal $e_2$, which is fed to a conventional balanced mixer 22 for mixing the reference signal with the carrier signal. The balanced mixer is used to suppress the reference signal and to translate the remaining information down to video frequency. By thus mixing the reference signal with the input signal, the upper and lower sidebands cancel each other and only single sideband information is retained in the output video spectrum at terminal 24. The limiter 20 maintains the reference signal at a constant level to supplement the suppression of the reference signal in the balanced mixer. Thus, assuming the single sideband information at terminal 10 is of the Doppler type, the output of mixer 22 contains substantially only the desired Doppler signal. In this manner, odd-ordered FM sidebands or even-ordered FM sidebands and amplitude-modulation noise sidebands due to tube noise or microphonics are cancelled out. The input signal source $e_{in}$ containing the carrier and sideband noise may be at substantially any frequency provided that the noise sidebands are symmetrically displaced above and below the center carrier frequency.

Referring to FIG. 2, there is shown another embodiment of the invention which is used in connection with a Doppler radar system. The cancellation operation of this system is in general similar to the system of FIG. 1. Only those parts which differ will be discussed. A radar transmitter 26, which is of the coherent continuous-wave type, feeds signals to an antenna 28 by way of a waveguide 27. The signals are radiated from antenna 28 and impinge upon surrounding objects to produce reflected echo signals. The reflected echo signals are picked up by a receiving antenna 29 and are mixed in a mixer 32 with a signal from a local oscillator 33. The local oscillator 33 is fed by a portion of the transmitted energy by means of a directional coupler 30 to provide a coherent reference for received Doppler signals. The local oscillator output differs from the carrier frequency by an intermediate frequency. The output of the mixer 32 contains frequencies equal to the carrier and a plurality of noise sideband frequencies at multiples of the intermediate frequency. These signal frequencies are simplified in an IF amplifier 34 and fed to balanced mixer 36 and to filter 38. A phase shifter 40 is adjusted to provide a phase shift of either zero or 90 degrees, depending upon whether noise sidebands are predominantly frequency modulated or amplitude modulated, respectively. The output of phase shifter 40 is fed to an amplifier-limiter 42 and to balanced mixer 36 to provide an output which contains substantially only the single sideband information. In this manner, the symmetrical sideband signals cancel out in the balanced mixer 36. In addition, a D.C. voltage appears at terminal 44 as a function of any minute phase and frequency misadjustment. This voltage is fed to a D.C. amplifier 48. The output of the D.C. amplifier 48 is fed to phase shifter 40 to provide a dynamic correction of phase shift in the reference channel. A typical phase shifter circuit for such dynamic control is one employing a well-known variable capacitance diode, not shown, as the capacitance element of an LC tank circuit. The reverse bias on the diode is changed by the D.C. control voltage from the aforementioned D.C. amplifier, and the junction capacitance changes, shifting the resonance frequency of the tank circuit. The intermediate frequency signal passes through the circuit and is phase shifted as a function of the bias applied to the diode. The output of mixer 36 contains direct current and signal sideband video components. A Doppler indicating or data processing device, not shown, can be connected to terminal 44 for Doppler signal or velocity processing.

While the embodiments shown herein and described have been treated from the standpoint of a Doppler-type system employing continuous wave transmission without the usual FM for range purposes, the device will operate equally well if frequency modulation or coding of the transmitted signal is achieved. In addition, the simplicity of the circuit disclosed permits the device to be contained in a smaller package than previously possible in feed-through nulling techniques inasmuch as the necessity for a separate local oscillator and multiple phase adjustments are eliminated. Since the reference signal is derived directly from the input signal, the resulting circuit simplicity provides a noise cancelling device which is less critical to adjust. To a major extent, changes in carrier frequency or phase are self compensating since the reference signal is internally derived from the carrier.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. In combination, means for producing a carrier signal having sideband frequency components, means for deriving a reference signal from said carrier signal, means for shifting the phase of said reference signal a predetermined number of degrees, and means to multiply said reference signal shifted in phase by an amount sufficient to cancel predetermined sideband frequency components from said carrier signal.

2. In combination, means for producing a carrier wave having sideband frequencies displaced above and below the frequency of the carrier, means for deriving a reference signal from said carrier wave, and means to mix the carrier signal with said reference signal shifted in phase by an amount sufficient to cause one of said sideband frequencies to cancel the other of said sideband frequencies.

3. In combination, means for producing a carrier signal having sideband frequencies displaced above and below the frequency of said carrier and a single sideband Doppler signal, means for providing a reference signal of predetermined phase with respect to said carrier signal, means for modulating said carrier signal and sidebands with said reference signal to cancel one sideband with the other of said sidebands, and means for extracting from said carrier signal said single sideband Doppler signal.

4. In combination, means for producing a carrier signal having sideband frequencies displaced equally above and below the frequency of the carrier, means for sampling said carrier signal and deriving a reference signal having a predetermined phase with respect to said carrier signal, means for multiplying said reference signal with said carrier signal and sideband signals to cancel one of said sideband frequencies with the other of said sideband frequencies.

5. In combination, means for producing a carrier signal having sideband frequencies displaced above and below the frequency of the carrier, means for sampling said output signal to provide a reference signal, means for passing said reference signal through a narrow band filter adapted to pass a first signal only at the carrier frequency of said carrier signal, means for shifting the phase of said first signal with respect to said carrier signal, and means for combining said phase shifted signal with said carrier signal.

6. In combination, a transmitter for producing a carrier signal having undesired symmetrical sideband frequencies coperating with a receiver, means for receiving and producing a reference signal from said carrier signal, said reference signal containing substantially only the carrier frequency of said carrier signal, means for shifting the reference signal in phase a predetermined number of degrees with respect to the carrier signal, and means for multiplying said reference signal with said carrier signal to cancel one of said sideband frequencies with the other of said sideband frequencies.

7. In combination, a continuous wave transmitter and a receiver coupled through a duplexer to an antenna, means for feeding said antenna with an output signal from said transmitter, means for sampling a portion of a received output signal to produce a reference signal, means for filtering out all components except the carrier frequency of said output signal, means for shifting the phase of said filtered signal a predetermined number of degrees, and means for multiplying said phase shifted signal with said output signal to provide cancellation of symmetrical sidebands of said carrier signal.

8. In combination, a transmitter for producing an output signal cooperating with a receiver, said output signal having undesired sideband frequencies above and below the carrier frequency of said output signal, means for receiving and producing a reference signal from said carrier signal, means for shifting in phase said reference signal, means for mixing said phase shifted reference signal and carrier signal to cancel said undesired sideband frequencies, and means for changing the phase of said phase shifting means in response to changes in the frequency and phase of said carrier signal.

9. In combination, means for producing a carrier signal having sideband frequencies displaced equally above and below the frequency of the carrier, means for sampling said carrier signal and producing a reference signal having a predetermined phase with respect to said carrier signal, means for mixing said reference signal with said carrier signal to cancel one of said sideband frequencies with the other of said sideband frequencies, and closed loop control means to change the phase of said reference signal in response to changes in the phase of said carrier signal.

10. In combination, a transmitter for producing a carrier signal having undesired symmetrical sideband frequencies cooperating with a receiver, means for receiving and producing a reference signal directly from said carrier signal, said reference signal containing substantially only the carrier frequency of said carrier signal, means for shifting the reference signal in phase substantially ninety degrees with respect to the carrier signal, and means for multiplying said reference signal with said carrier signal to cancel one of said amplitude modulated sideband frequencies with the other of said amplitude modulated sideband frequencies.

11. In combination, a transmitter for producing a carrier signal having undesired symmetrical sideband frequencies cooperating with a receiver, means for receiving said carrier signal and producing a reference signal directly from said carrier signal, said reference signal containing substantially only the carrier frequency of said carrier signal, means for shifting the reference signal in phase substantially zero degrees with respect to the carrier signal, and means for multiplying said reference signal with said carrier signal to cancel one of said frequency modulated sideband frequencies with the other of said frequency modulated sideband frequencies.

12. In combination, a continuous wave transmitter and a receiver coupled through a duplexer to an antenna, means for feeding said antenna with an output signal from said transmitter, means for sampling a portion of said output signal from said receiver to produce a reference signal, means for filtering out all components except the carrier frequency of said output signal, means for shifting the phase of said filtered signal a predetermined number of degrees, and means for multiplying said phase shifted signal with said output signal to provide cancellation of symmetrical sidebands of said carrier signal, said latter means including balanced mixing means to suppress said reference signal.

References Cited in the file of this patent
UNITED STATES PATENTS

| | | |
|---|---|---|
| 2,896,162 | Berger | July 21, 1959 |
| 3,021,521 | Hutchins | Feb. 13, 1962 |